US011507662B2

(12) United States Patent
Addepalli

(10) Patent No.: US 11,507,662 B2
(45) Date of Patent: Nov. 22, 2022

(54) SYSTEMS AND METHODS OF SECURITY FOR TRUSTED ARTIFICIAL INTELLIGENCE HARDWARE PROCESSING

(71) Applicant: Sateesh Kumar Addepalli, San Jose, CA (US)

(72) Inventor: Sateesh Kumar Addepalli, San Jose, CA (US)

( * ) Notice: Subject to any disclaimer, the term of this patent is extended or adjusted under 35 U.S.C. 154(b) by 633 days.

(21) Appl. No.: 16/528,545

(22) Filed: Jul. 31, 2019

(65) Prior Publication Data

US 2020/0250312 A1 Aug. 6, 2020

Related U.S. Application Data

(60) Provisional application No. 62/801,044, filed on Feb. 4, 2019.

(51) Int. Cl.
*G08B 23/00* (2006.01)
*G06F 12/16* (2006.01)
(Continued)

(52) U.S. Cl.
CPC .......... *G06F 21/567* (2013.01); *G06F 21/566* (2013.01); *G06F 21/57* (2013.01);
(Continued)

(58) Field of Classification Search
CPC ...... G06F 21/567; G06F 21/566; G06F 21/57; G06F 21/602; G06F 2221/033; G06N 20/00
(Continued)

(56) References Cited

U.S. PATENT DOCUMENTS 5,487,153 A * 1/1996 Hammerstrom .... G06F 15/8007
718/100
8,521,664 B1 8/2013 Lin et al.
(Continued)

FOREIGN PATENT DOCUMENTS

CN 102893233 B 1/2016
WO 2011050482 A1 5/2011
(Continued)

OTHER PUBLICATIONS

David Gunning; DARPA's Explainable Artificial Intelligence Program; AI Magazine Year: 2017; pp. 44-58.*
(Continued)

*Primary Examiner* — Monjur Rahim
(74) *Attorney, Agent, or Firm* — Steven A. Nielsen; www.NielsenPatents.com

(57) ABSTRACT

Aspects of the present disclosure are presented for an AI system featuring specially designed AI hardware that incorporates security features to provide iron clad trust and security to run AI applications/solution models. Presented herein are various security features for AI processing, including: a trust and integrity verifier of data during operation of an AI solution model; identity and trust establishment between an entity and the AI solution model; secure isolation for a virtual AI multilane system; a real-time attack detection and prevention mechanism; and built in detection mechanisms related to rogue security attack elements insertion during manufacturing. Aspects also include security to implement an AI network interconnecting multiple user devices in an AI environment.

15 Claims, 9 Drawing Sheets

(51) Int. Cl.
  *G06F 12/14* (2006.01)
  *G06F 11/00* (2006.01)
  *G06F 21/56* (2013.01)
  *G06F 21/57* (2013.01)
  *G06F 21/60* (2013.01)
  *G06N 20/00* (2019.01)
  *G06N 5/04* (2006.01)

(52) U.S. Cl.
  CPC ...... *G06F 21/602* (2013.01); *G06F 2221/033* (2013.01); *G06N 5/04* (2013.01); *G06N 20/00* (2019.01)

(58) Field of Classification Search
  USPC .......................................................... 726/23
  See application file for complete search history.

(56) References Cited

U.S. PATENT DOCUMENTS

| | | | |
|---|---|---|---|
| 9,285,783 | B2 | 3/2016 | Craig et al. |
| 11,263,646 | B1* | 3/2022 | Johnston ............ G06F 16/24578 |
| 2008/0059799 | A1* | 3/2008 | Scarlata ................. H04L 9/0897 713/176 |
| 2008/0137550 | A1 | 6/2008 | Jurca et al. |
| 2008/0235162 | A1* | 9/2008 | Spring ................. G10L 15/1822 706/11 |
| 2010/0185566 | A1* | 7/2010 | Schott ..................... G06N 5/043 706/10 |
| 2010/0285082 | A1 | 11/2010 | Fernandez |
| 2012/0101652 | A1 | 4/2012 | Shin et al. |
| 2012/0150361 | A1 | 6/2012 | Lazaris |
| 2012/0311488 | A1 | 12/2012 | Mouton et al. |
| 2013/0111487 | A1 | 5/2013 | Cheyer et al. |
| 2013/0262349 | A1 | 10/2013 | Bouchra et al. |
| 2015/0235308 | A1 | 8/2015 | Mick et al. |
| 2016/0239074 | A1 | 8/2016 | Lee et al. |
| 2017/0005515 | A1 | 1/2017 | Sanders et al. |
| 2017/0103314 | A1 | 4/2017 | Ross |
| 2017/0109668 | A1* | 4/2017 | Marcu ........................ G06F 8/30 |
| 2017/0123419 | A1 | 5/2017 | Levinson et al. |
| 2017/0213128 | A1 | 7/2017 | Hammond et al. |
| 2017/0213131 | A1* | 7/2017 | Hammond ................. G06F 8/31 |
| 2017/0308800 | A1 | 10/2017 | Cichon et al. |
| 2017/0318008 | A1* | 11/2017 | Mead ....................... G06F 21/31 |
| 2017/0323197 | A1* | 11/2017 | Gibson .................. G06N 3/063 |
| 2018/0129952 | A1 | 5/2018 | Saxena et al. |
| 2018/0293463 | A1 | 10/2018 | Brown |
| 2018/0322390 | A1* | 11/2018 | Das ......................... G06N 3/063 |
| 2018/0322419 | A1* | 11/2018 | Bugenhagen ........... G06N 5/043 |
| 2019/0013932 | A1* | 1/2019 | Maino ..................... G06N 20/00 |
| 2019/0108443 | A1* | 4/2019 | Dwarakanath ...... G06F 11/3684 |
| 2019/0156241 | A1* | 5/2019 | Hughes ................... G06F 16/25 |
| 2020/0019697 | A1* | 1/2020 | Shen .................... G06F 21/6209 |
| 2020/0092082 | A1* | 3/2020 | Raman .................. H04L 9/3236 |
| 2020/0111096 | A1* | 4/2020 | Liu ......................... G06N 5/022 |

FOREIGN PATENT DOCUMENTS

| | | |
|---|---|---|
| WO | 2017132590 A1 | 8/2017 |
| WO | 2018184208 A1 | 10/2018 |
| WO | 2018218259 A1 | 11/2018 |
| WO | 2019010065 A1 | 1/2019 |
| WO | 2020163303 A1 | 8/2020 |
| WO | 2020163308 A1 | 8/2020 |
| WO | 2020163315 A1 | 8/2020 |
| WO | 2020163320 A1 | 8/2020 |
| WO | 2020163333 A1 | 8/2020 |
| WO | 2020168100 A1 | 8/2020 |
| WO | 2020172045 A1 | 8/2020 |

OTHER PUBLICATIONS

International Search Report and Written Opinion for International PCT Application No. PCT/US2020/016583, dated May 21, 2020.
International Search Report and Written Opinion for International PCT Application No. PCT/US2020/016545, dated Jun. 4, 2020.
International Search Report and Written Opinion for International PCT Application No. PCT/US2020/016565, dated Jun. 4, 2020.
International Search Report and Written Opinion for International PCT Application No. PCT/US2020/016553, dated May 28, 2020.
Wagh et al., Efficient and Private Neural Network Training [online] May 14, 2018 [retrieved May 29, 2020] from https://eprint.iacr.org/2018/442/20180514:150605; Abstract.
International Search Report and Written Opinion for International PCT Application No. PCT/US2020/016560, dated Apr. 30, 2020.
International Search Report and Written Opinion for International PCT Application No. PCT/US2020/016574, dated Apr. 30, 2020.
International Search Report and Written Opinion for International PCT Application No. PCT/US2020/018142, dated May 28, 2020.
International Search Report and Written Opinion for International PCT Application No. PCT/US2020/018150, dated May 21, 2020.

* cited by examiner

SYSTEMS AND METHODS OF SECURITY FOR TRUSTED ARTIFICIAL INTELLIGENCE HARDWARE PROCESSING

CROSS REFERENCE TO RELATED APPLICATION

This application claims priority to U.S. Provisional Application No. 62/801,044, filed Feb. 4, 2019, and titled "SYSTEMS AND METHODS OF SECURITY FOR TRUSTED ARTIFICIAL INTELLIGENCE HARDWARE PROCESSING," the disclosure of which is hereby incorporated herein by reference in its entirety and for all purposes.

TECHNICAL FIELD

The subject matter disclosed herein generally relates to artificial intelligence. More specifically, the present disclosures relate to methods and systems of security for trusted artificial intelligence (AI) hardware processing.

BACKGROUND

Today, AI solutions and/or AI models (which may be referred to herein as AI solution models) have been pre-trained and then deployed in a wide range of applications (e.g., cloud/edge, connected/autonomous vehicles, industrial IoT (Internet of Things), health and wellness, smart cities/spaces, etc.). The AI solution model may be an output from an AI system that solves a problem or a request made by a user. For example, an AI solution model may be the output by the AI system based on the user having requested of the AI system to generate a model that, when performed by the AI system, organizes images into various categories after being trained on a set of training data. It is desirable for AI solution models to be dynamically pushed for online training and inferences, used by different stakeholders. Aspects of the present disclosure allow for AI solution models to be dynamically generated using specially configured hardware. For example, in a vehicle environment, models maybe pushed, trained or run by OEMs, insurance companies, different service providers, owners, different drivers and so on. These models may run one at a time or multiple models in parallel. For example, in some embodiments, the AI hardware allows for a setup of different virtual multi-lanes that run different models from different stakeholders one at a time or in parallel to accomplish multiple decisions at the same time. Currently, competition such as graphics processing unit/tensor processing unit (GPU/TPU) does not have any mechanisms whatsoever to provide trust and security to the AI app/solution models.

BRIEF DESCRIPTION OF THE DRAWINGS

Some embodiments are illustrated by way of example and not limitation in the figures of the accompanying drawings.

DETAILED DESCRIPTION

Figure 1:
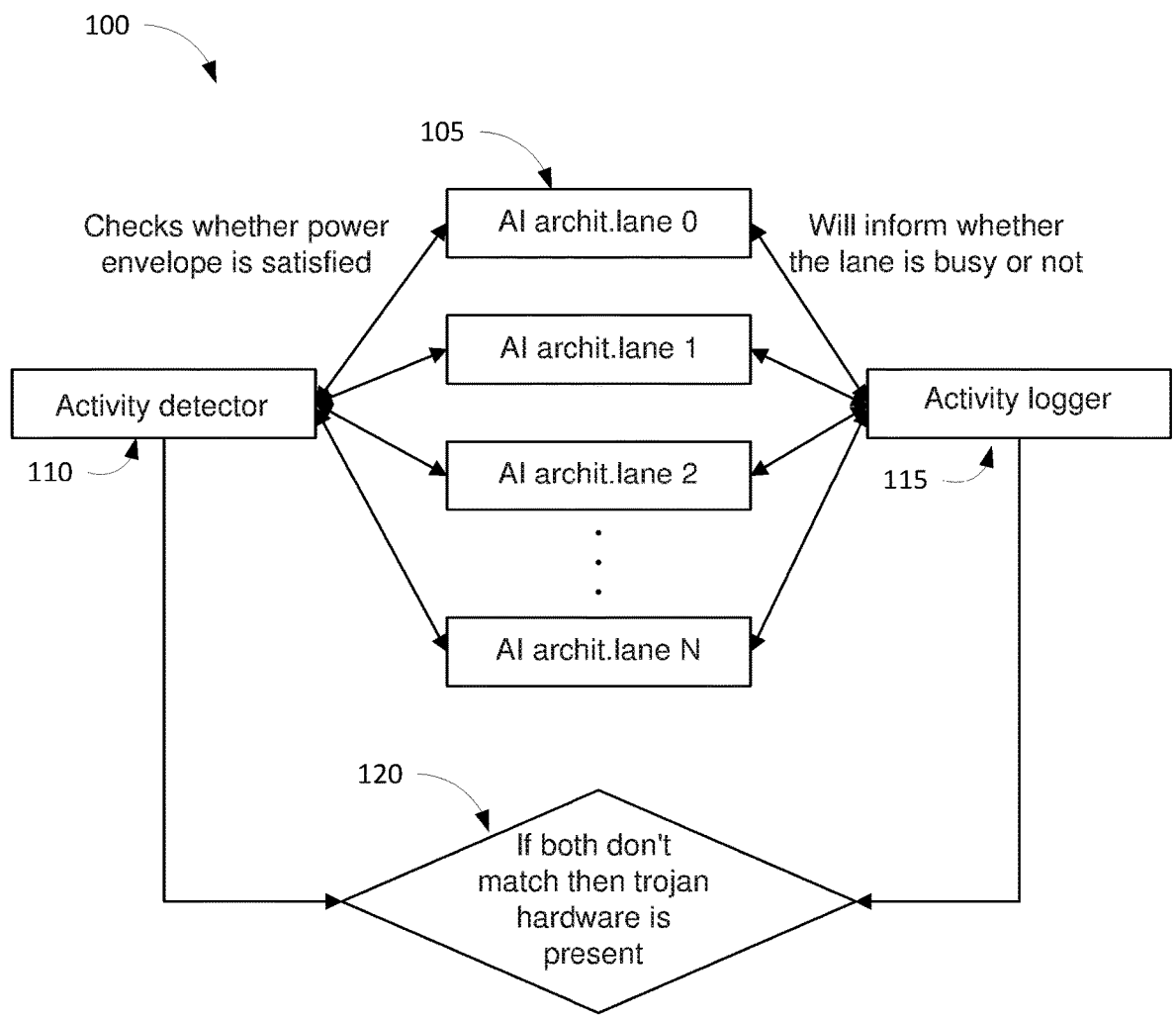
FIG. 1 is a diagram of a comparison system for determining whether there is an anomaly built into the hardware, in accordance with at least one aspect of the present disclosure.

Applicant of the present application owns the following U.S. Provisional Patent Applications, contemporaneously filed on Feb. 4, 2019, the disclosure of each of which is herein incorporated by reference in its entirety:

U.S. Provisional Application No. 62/801,046, titled SYSTEMS AND METHODS FOR ARTIFICIAL INTELLIGENCE HARDWARE PROCESSING;

U.S. Provisional Application No. 62/801,048, titled SYSTEMS AND METHODS FOR ARTIFICIAL INTELLIGENCE HARDWARE PROCESSING;

U.S. Provisional Application No. 62/801,049, titled SYSTEMS AND METHODS FOR CONTINUOUS AND REAL-TIME AI ADAPTIVE SENSE LEARNING;

U.S. Provisional Application No. 62/801,050, titled LIGHTWEIGHT, HIGH SPEED AND ENERGY EFFICIENT ASYNCHRONOUS AND FILE SYSTEM-BASED ARTIFICIAL INTELLIGENCE PROCESSING INTERFACE FRAMEWORK; and U.S. Provisional Application No. 62/801,051, titled SYSTEMS AND METHODS FOR POWER MANAGEMENT OF HARDWARE UTILIZING VIRTUAL MULTILANE ARCHITECTURE.

Applicant of the present application also owns the following U.S. Non-Provisional Patent Applications, filed herewith, the disclosure of each of which is herein incorporated by reference in its entirety:

U.S. patent application Ser. No. 16/528,543, titled SYSTEMS AND METHODS FOR ARTIFICIAL INTELLIGENCE HARDWARE PROCESSING;

U.S. patent application Ser. No. 16/528,548, titled SYSTEMS AND METHODS FOR ARTIFICIAL INTELLIGENCE WITH A FLEXIBLE HARDWARE PROCESSING FRAMEWORK;

U.S. patent application Ser. No. 16/528,549, titled SYSTEMS AND METHODS FOR CONTINUOUS AND REAL-TIME AI ADAPTIVE SENSE LEARNING;

U.S. patent application Ser. No. 16/528,551, titled LIGHTWEIGHT, HIGH SPEED AND ENERGY EFFICIENT ASYNCHRONOUS AND FILE SYSTEM-BASED AI PROCESSING INTERFACE FRAMEWORK; and U.S. patent application Ser. No. 16/528,553, titled SYSTEMS AND METHODS FOR POWER MANAGEMENT OF HARDWARE UTILIZING VIRTUAL MULTILANE ARCHITECTURE.

In various aspects, the present disclosure provides protection for AI application/solution models, including techniques disclosed herein in conjunction with AI architecture implementation blocks such as a security processing logic units (S-PLUs) and artificial intelligence processing logic units (AI-PLUs) described hereinbelow in connection with FIGS. 5-7, can be employed to create AI driven security solutions for a wide range of use cases and markets, namely mobile, IoT, autonomous vehicles, smart cities, smart health and other fog/cloud applications, and more.

Aspects of the present disclosure are presented for an AI system featuring specially designed AI hardware that incorporates security features to provide iron clad trust and security to run AI applications/solution models. The AI system may include an multi-tenancy capable AI system, where multiple clients or users may access the larger AI system simultaneously in a trusted and secure environment. Presented herein are various security features for AI processing, including:

1. A trust and integrity verifier of AI application solution model data and parameters and related state machine parameters before and during running (e.g., training or inference) an AI solution model;

2. Identity and trust establishment between an entity (e.g., the user) and the AI solution model to ensure the rightful stake holder is running the model;

3. Secure isolation for virtual AI multilane system to ensure leakage and theft is prevented;

4. A real-time attack detection and prevention mechanism, either from inside Trojan induced attacks or other inside sources or from outside the AI system; and 5. Built in detection mechanisms related to rogue security attack elements insertion during manufacturing.

These features will be discussed in more detail below.

1. Integrity Check Through Hash for the Entire AI Application/Solution Model Data In some embodiments, integrity of the model is verified by hashing chunks of the model or the whole model. Integrity of the model helps to ascertain whether the model was corrupted by an attacker. The AI system engines implement the integrity check by embedding it in a state machine of the hardware, according to some embodiments. If the security is enabled, the state machine engines engage a security programmable logic unit (S-PLU) hashing instance and then hashes the model by chunks or the entire model. The state machine then verifies the generated hashes with hashes provided by the user. If both hashes match, then the system determines that the model's integrity is not compromised.

In some embodiments, a process for implementing the integrity check may be performed by a security part of the state machines within the AI system compute block in conjunction with S-PLUs enforce security principles defined above. In some embodiments, to perform the integrity check, the security part of the state machine belonging to the compute block/engine will perform the following processes:

a. Retrieve security parameters taken such as decryption key, digest value, etc.;

b. Compose the S-PLU to process hashing;

c. Execute integrity check by invoking S-PLU hash instance with digest value and necessary model data (either model or chunk) and if results match, conclude integrity is ascertained; and d. Then invoke the decryption with key, if AI solution model encryption is enabled.

2. Identity and Trust Establishment Between the Entity and the AI Solution Model to Verify Rightful Stake Holder Even though the model may be correct, measures should also be taken to ensure the rightful entity is running the AI solution model. This section discusses a process for how the AI system may identify and establish trust that the entity is the intended user.

In some embodiments, a policy engine of the AI system acts as a user agent, and will interact with a trusted AI network coupled to the AI system, to obtain association between the AI solution model and the user running the AI solution model. This information may be stored in the trusted memory for security parameters.

In some embodiments, the security part of the compute engine state machine will ascertain this association. If there is mismatch with the signature ID provided by the user in the start and signature ID provided while running the model, then the security part can ascertain that the original user is not running the model. Execution will be stopped and an alert will be sent to the virtual lane orchestrator, for example.

The policy engine and security part of the state machines within the AI System compute block in conjunction with S-PLUs may be configured to enforce the security principles defined above.

3. Secure Isolation Between Virtual AI Multilane System to Ensure Leakage and Theft is Prevented In some embodiments, the AI system is configured to perform AI processing for multiple entities at the same time, as part of a multilane tenancy system. The security measures described herein help ensure that stake holders accessing the AI system will not be able to steal each others' models and their associated data. Described in this section below are several features that contribute to AI secure isolation.

Model isolation can occur by associating each model with various unique identifiers, such as member ID, member credentials, and model ID, corresponding security credentials registered before running a model in an AI system of the present disclosure. The AI system is configured to provide each entity with its own virtual "lane" for processing. During the process of execution, these credentials are used by each respective virtual lane to ensure integrity and ownership of models. Also, the model data and the intermediate data can be run in encryption mode, in some embodiments. Hence, a second layer of defense is enforced to avoid any mishaps.

In some cases, to further ensure isolation and prevent leaks or theft, credentials are flushed after AI solution models complete. The memory space in the local memory is divided dependent on the model ID and member ID. The access done by the state machine of the compute engines may be governed by the address offset associated with model ID and member ID.

In some embodiments, model transfer to/from memory and a virtual lane may be restricted to assigned virtual lanes, based on those tied to one or more of the unique identifiers.

Models may be encrypted while in memory. They may be decrypted inside an AI system lane compute block while they are executed in the assigned virtual lane. This provides isolation between virtual lanes and their models.

As one example of implementation, the security part of the state machines within the AI system compute block in conjunction with S-PLUs as described above, will enforce security principles described in this section.

4. Real-Time Attack Detection and Prevention Mechanisms Built into the AI System (Whether an Inside Trojan Induced or Other Inside Sources or from Outside the AI System)

Because the AI system will be exposed to network, storage, CPU, and memory interfaces, inside or outside attacks can overwhelm and stall its operation. One example is an attack employing model spoofing. In some embodiments, mechanisms are presented to detect, report and prevent such attacks and are described herein.

In some embodiments, the virtual lane AI system contains hashing PLUs, encryption/decryption PLUs and pattern matching PLUs. The pattern matching PLU may be used to protect the AI virtual lane system against real time attacks from the external interfaces, e.g., a network, external CPU etc. It can run various snort rules to check whether a virus signature is present in the data. Different snort rules can be programmed to the memory. Then, all the rules can be checked in real time on the input data. If any of the snort rule checks positive, then the user will be alerted regarding the type of virus present in the data and how it could affect the user. The user can set the snort rules depending on the severity of the attacks prone to the company. The snort rules are programmable hence they can be updated in routine fashion so that all the existential threats can be covered.

A second line of defense is checking the hash of the model running in a lane of the AI system. The hashing AI-PLU in the lane hashes the model data given as input. The final hash produced must match the hash provided by the user. If the hash output doesn't match, then the system can conclude that somebody tried to tamper with the model data. This acts as a signature to the model given by the user. Hence, the model can be authenticated whether it matches the model provided by the user. Only models which pass this test will be executed on the engine. It also implements the error checking of the model while transmission. Thus, if the data was altered in transmission due to a hardware error, then this model can tell us whether the model is correct or not.

The AI engine also supports encryption and decryption of the data. This is useful when the user has to execute the AI solution models on a third party cloud platform. If the model data and the model network structure are not encrypted, then third party cloud will have access to this data and can sell this data to other entities (such as its competition). To protect the model data and structure from third party cloud platforms, the AI system of the present disclosure supports encryption and decryption of the model that is prepared for a user. Hence, the user can send encrypted models to the AI system, which will then decrypt the model data. It will use this decrypted data to run on the engine. Once all the layers in the model are run, it will encrypt the output results. The encrypted results will be sent to the user. This provides end to end encryption of the execution, so that nobody midstream will have access to the copyright/intellectual property of the user.

Thus, presented herein are at least three different layers to protect a model created for a user from being stolen, detect virus signatures in the data, and also authenticate the model executing on the AI engine.

5. Built in Detection Mechanisms Related to Rogue Security Attack Elements Insertion During Manufacturing In some embodiments, the AI system will be secured against the Trojan insertion during the fabrication of the hardware in the foundries. Due to globalization of the economy, to be competitive, most of the chip companies opt to operate in a fabless environment. Most of the fabrication foundries are present in Asia. The designs are sent to fabrication foundries overseas if the designs are developed in the United States, for example. This leaves open the possibility that the third party fabrication company could insert backdoor entrances (e.g., Trojans) directly into the chip design. Hence, there is a need to make the chip secure against the insertion of the hardware Trojans by a third party fabrication entity.

The third party Trojan may be used for a number of reasons, such as denial of service, leak of secret algorithms, leak of the encryption/decryption keys, or for using the AI system hardware as botnets. The chip must therefore be secured against these kinds of Trojan insertions.

By checking the activity of different areas of the chip after the fabrication, one can find whether there is an unusual amount of operation at certain areas of the chip which should have been dormant at that time. For example, adders in the AI-PLU must be active only when using the compute engine blocks. So if the part of the chip area where the AI-PLU is placed is active at a different time, then some anomaly hardware would have been introduced in that area by the third party fabrication entity which could be Trojan hardware. In general, the AI system contains monitoring means for running diagnostics to determine whether some parts of the chip are running more or less than they are expected to at various times of planned operation. These kinds of mechanisms may be used to detect anomalies that appear dormant functionally, but in reality are backdoor insecurities in the system.

Aspects of the present disclosure include a novel mechanism, wherein, during normal operation, each logic block related to the AI system will be configured to inform an associate activity detector if it is operational. FIG. 1 shows a diagram 100 of a comparison system for determining whether there is an anomaly built into the hardware, consistent with the descriptions herein. An activity detector 110 examines the types of activity occurring at the chip, in the hardware, at each AI system lane 105 (e.g., lanes, 0, 1, 2, . . . N) and is compared against an activity logger 115 that records actions and commands that are intended to be utilized during one or more operations. A flag will issue if the activity detector 110 detects any activity when that block or lane 105 in the chip is not intended to be active. Each line of operation is compared in sequence to determine what, if anything, may be anomalous. At block 120, if a comparison at the same index in the sequence of actions does not match, then it may be concluded that there is a weakness, such as a Trojan backdoor built into the hardware.

In addition, if no activity is detected for a certain portion of the chip, then the AI system logic block will inform it is not active. Activity detection can be based on, but not limited to, measuring power envelope (e.g., current flow, voltage, temperature, etc.). If the AI system logic block is not active, there is expected to be a nominal/minimal power envelope. If there is any power envelope going beyond the nominal power envelope, the system may conclude that a Trojan/malicious block is active and the activity detector will flag it.

In some embodiments, the logic block for performing this detection could be collection of logic gates which could represent a functional block or group of functional blocks.

6. Trusted AI Solution Model Network

Aspects of the present disclosure are presented also for a trusted AI solution model network that is interconnected to other domains not fully under the control of a single entity. Today's AI processing engines lack trusted infrastructure for AI solution models being run on the engines, exposing millions of AI processing engines to potentially unintended consequences, safety and security hazards. There is a need to creating a secure infrastructure and identity verification for such a network.

Presented herein in a trusted AI solution model network, where members of the network can push or pull the AI solution models dynamically to/from the network. For example, if a given trusted AI solution model network belongs to a health care system, then members belonging to that community can push models to the network. Access policies are applied to ensure only permitted members can push or pull one or more AI solution models to/from the network. Granularity of the access can implemented, such as providing full public access and restricted private access to push or pull an AI solution model in other contexts. AI solution model networks can be maintained by private entities or public entities. For example, Auto OEMs may maintain a private AI solution model network of autonomous vehicle AI solution models. As another example, the Center for Disease Control (CDC) may maintain a public AI solution model network for pandemic diseases. Similarly, the Department of Motor Vehicles (DMV) may maintain a public AI solution model network for detecting road conditions. In some embodiments and generally, the AI solution model network can:

a. Ascertain the identity of a member belonging to the trusted AI network model membership through credentials;

b. Verify that any particular model belongs to the trusted AI solution model network;

c. Allow storage and retrieval of AI solution models to/from the AI solution model network in a distributed fashion;

d. Provide provision to monitor and detect bad members for accountability having trusted arbitration authority; and e. Operate credential acquisition from the trusted network and enforcement at various steps in an AI application solution compute hardware security enabled state machine in conjunction with S-PLUs in a cloud and edge environment, while running a model for a given user member.

Figure 2:
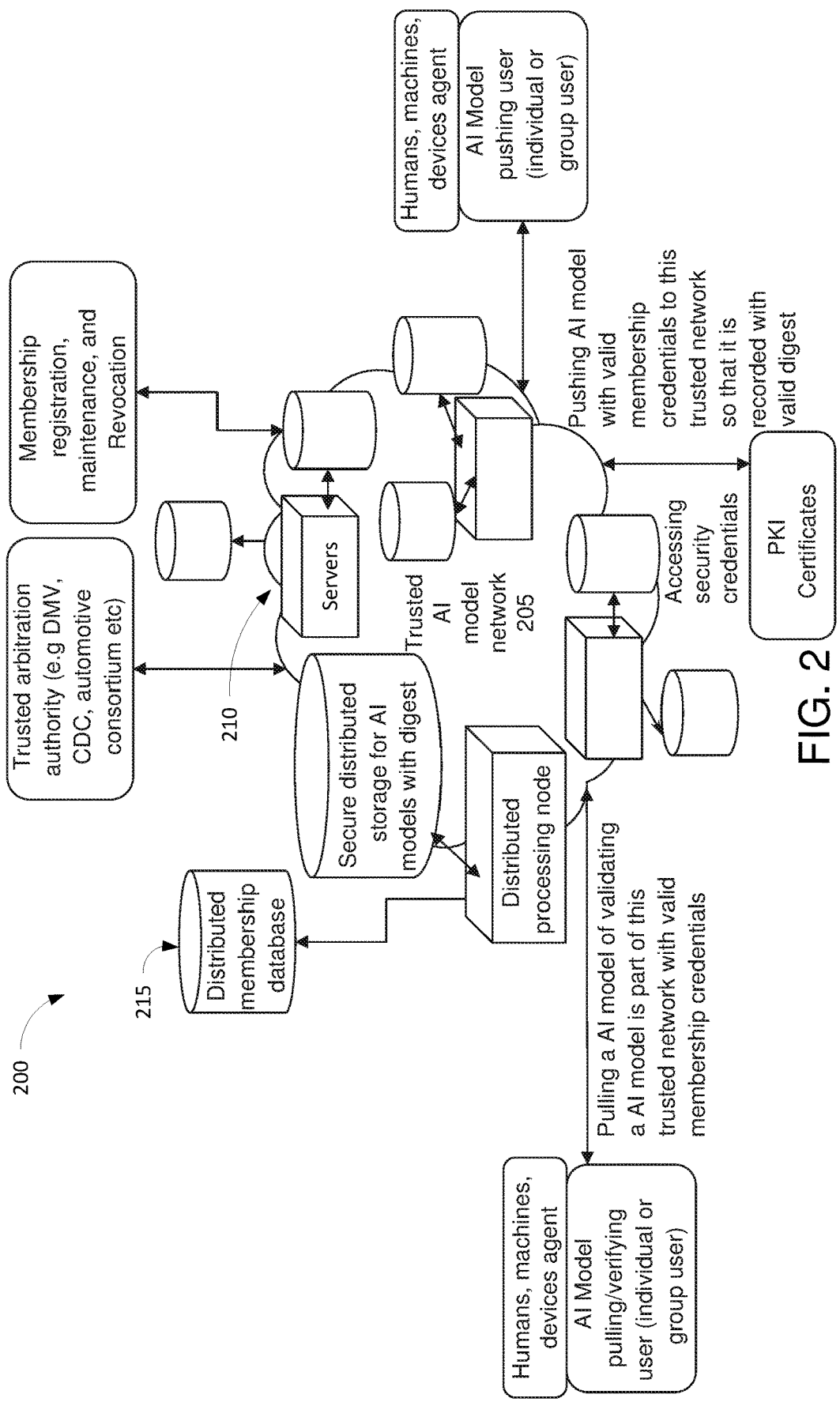
FIG. 2 is an example of an overall trusted AI solution model network architecture, in accordance with at least one aspect of the present disclosure.

A. Network Side—Trusted AI Solution Model:

Illustration 200 of FIG. 2 shows an example of an overall trusted AI solution model network 205 architecture. Various entities are involved, such as distributed AI solution model services servers 210, a secure distributed database 215 of encrypted models with digest entries, roles of each entity, and various stake holders. Various features of the network include: Flow from/to entity and Trusted Model network; Members registration (individual or group user); Members verification and authentication; Model entry by authorized member; Model association with authorized user; Model Encryption; and Model validation and verification to ensure it is part of the network.

In some cases, AI solution models may be linked together to create an AI solution model train/chain to prevent any of the models from being tampered or altered. For example, in some cases, block chain technology or other similar distributed chain technology can be used to achieve this goal. As another example, a protocol for communicatively connecting multiple AI solution models securely may be used in autonomous vehicles where it may be useful to sync the autonomous vehicles together while they are moving. This may allow for the autonomous vehicles to move in a coordinated fashion and can be prevented from being tampered with.

There can be multiple AI solution model groups of AI solution model trains/chains to represent different AI solution model types, user/user groups and organizations that have some degree of control.

B. User Agent—Device Side Implementation in the AI System

Aspects of the present disclosure also include a secure AI application solution hardware computer that incorporates the following constructs. Specifically, the AI application solution hardware includes S-PLUs, along with re-configurable security hardware state machines to accomplish the above security goals from the AI solution model user agent perspective:

1. S-PLU Instance for Cryptography—PKI Encryption/Decryption;

2. S-PLU Instance for Cryptography —Hash function; and

3. S-PLU Instance for Pattern Matching

Further details about these SPLUs are described in U.S. Provisional Application No. 62/801,046, filed Feb. 4, 2019, which is again incorporated herein by reference.

C. Interaction Between Agent and AI Solution Model Network

Figure 3:
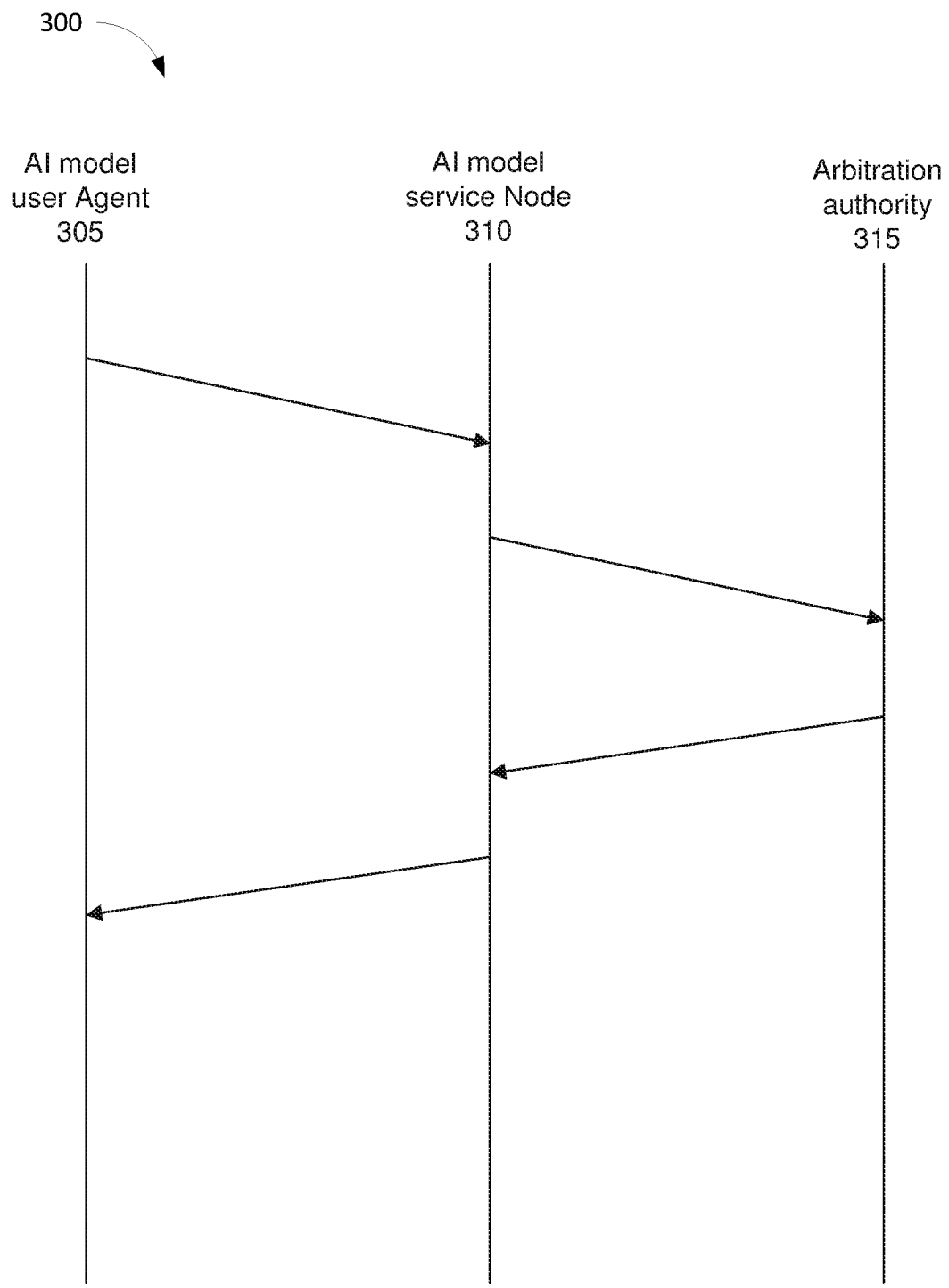
FIG. 3 is an example of a handshake between an AI solution model user agent, which may exist on a client device, an AI solution model service node, which may exist in the trusted model network, and an arbitration authority to verify the handshakes, in accordance with at least one aspect of the present disclosure.
Figure 4:
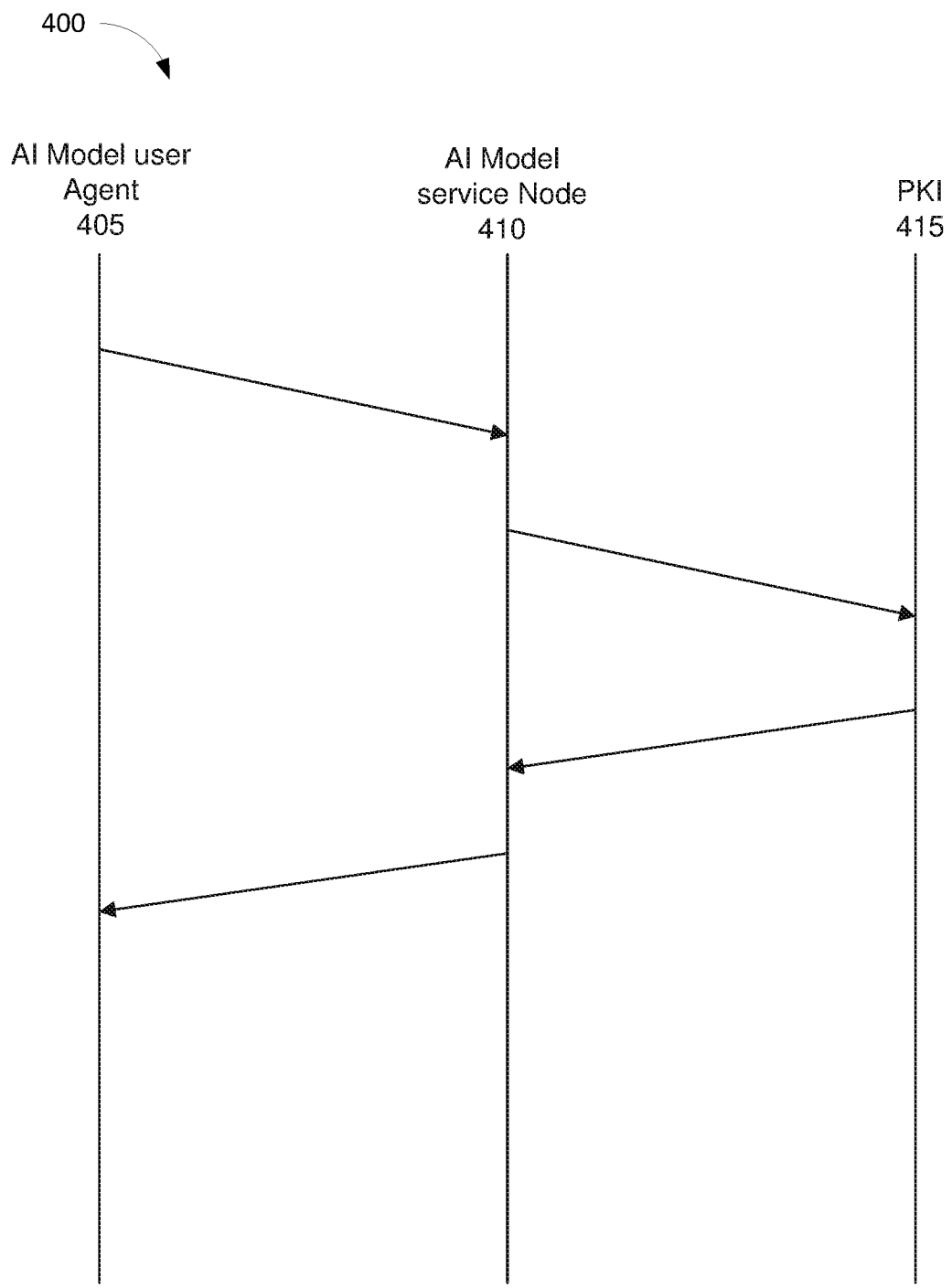
FIG. 4 is a diagram of a handshake between an AI solution model user agent and a PKI certificate via an AI solution model service node, in accordance with at least one aspect of the present disclosure.

The present disclosure also includes protocols/handshakes between a trusted AI solution model network and a device running an AI application/solution model. FIG. 3 shows a diagram 300 of an example protocol of handshakes between an AI solution model user agent 305, which may exist on a client device, an AI solution model service node 310, which may exist in the trusted model network, and an arbitration authority 315 to verify the handshakes. In a second diagram 400 of an example referring to FIG. 4, a PKI certificate 415 may be provided back to the AI solution model service node 410 and the AI solution model user agent 405 that works with both to ensure the proper interaction between the agent and the AI solution model network.

Based on the descriptions herein, having a trusted model network allows for large scale deployment of AI applications/solutions that strongly rely on trust and have many security pitfalls, such as a network of autonomous vehicles without worrying about rogues introducing malignant AI solution models to the AI applications/solutions. The secure, trusted AI network thus creates safety, security of enhances public/private life and wealth. In addition, the security embedded compute state normal executed chain of the AI system, as described, removes additional security performance penalties as in the case of existing standard security practices. Third, by securing AI application models using the trusted model network and AI system built-in security allows various types of entities to run their AI solution models in cloud and fog environments with absolute trust and confidence.

Figure 5:
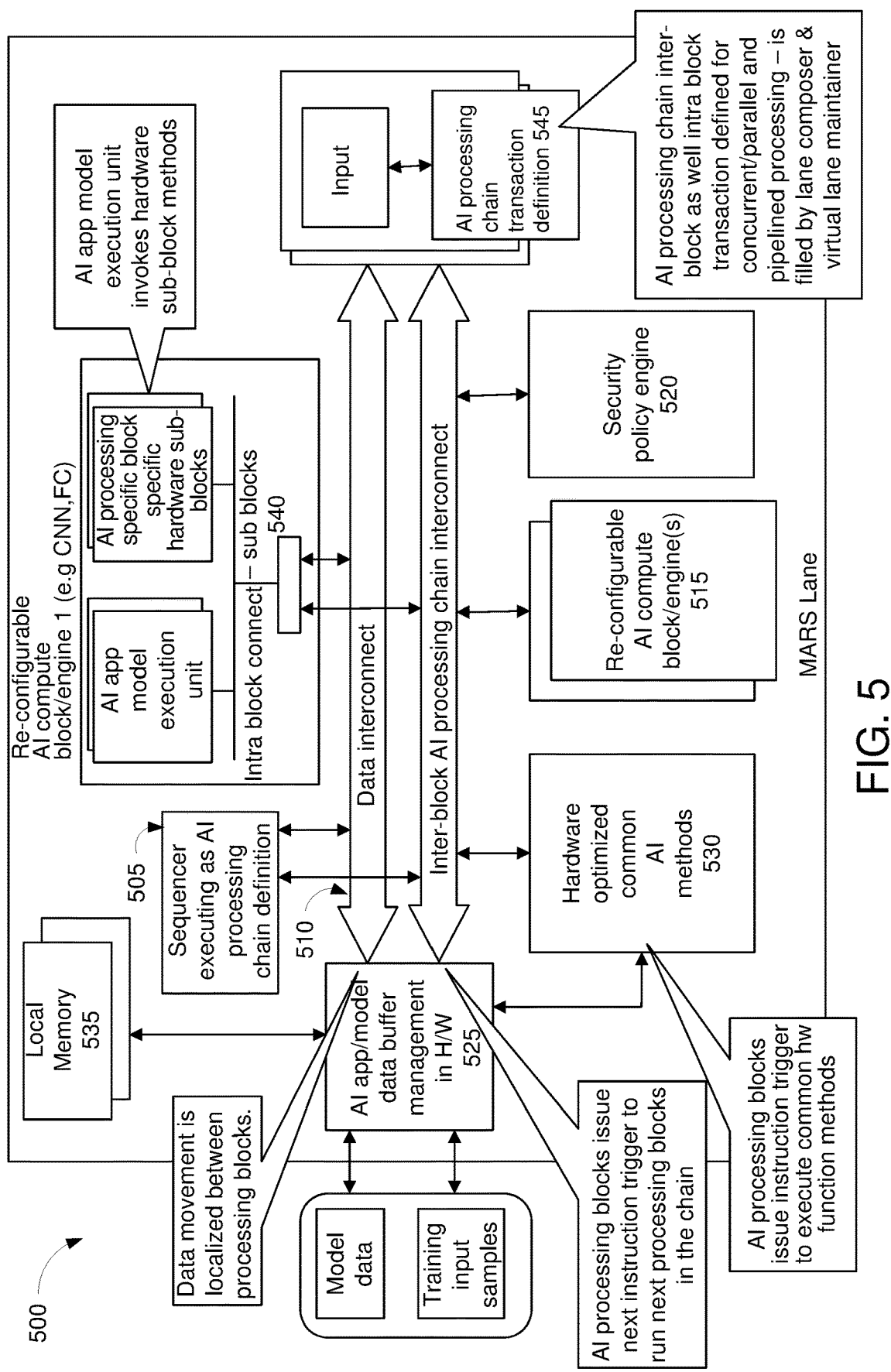
FIG. 5 is a diagram of an AI system lane comprising energy efficient hyper parallel and pipelined temporal and spatial scalable artificial intelligence (AI) hardware with minimized external memory access, in accordance with at least one aspect of the present disclosure.

Referring to FIG. 5, diagram 500 shows an AI system lane comprising energy efficient hyper parallel and pipelined temporal and spatial scalable artificial intelligence (AI) hardware with minimized external memory access, in accordance with at least one aspect of the present disclosure. An AI system lane is an integrated secure AI processing hardware framework with an amalgamation of hyper-parallel-pipelined (HPP) AI compute engines interlinked by data interconnect busses with a hardware sequencer 505 to oversee AI compute chain execution. The execution flow is orchestrated by the sequencer 505 by using an AI processing chain flow. The blocks within the AI system lane are interconnected by high bandwidth links, e.g., data interconnects 510 and inter-block AI processing chain interconnects, to transfer the output between each other. Therefore, one or more AI compute engines can run in parallel/pipeline to process the AI algorithm.

In various aspects, an AI system lane comprises eight major blocks, such as re-configurable AI compute engine blocks 515, interconnects 510, a sequencer 505, common method processing blocks 530, local memory 535, security policy engine block 520, AI application data management buffer 525, intra block connect sub blocks 540, etc. All the modules work together to solve the task assigned to the AI system lane.

In one aspect, the AI system lane comprises re-configurable AI compute engines/blocks hardware 515. The re-configurable AI compute engines/blocks hardware is an AI system integrated high performance and highly efficient engine. The re-configurable AI compute engines/blocks hardware computes the AI methods assigned by the sequencer 505. The sequencer 505 is comprised of a state machine with one or more configurable AI-PLUs to process the AI application/model. The sequencer 505 maintains a configurable AI-PLU to compute different type of methods. Due to the configurable nature of the hardware, utilization is very high. Hence, a high throughput is achieved at a low clock frequency and the process is very energy efficient. In case of secure processing, it also contains one or more S-PLUs to process security related features and consequently provide iron clad security to the AI system lane as well as enabling a wide range of AI driven security applications. The re-configurable AI compute engine blocks 515 eliminate the need for an operating system and AI software framework during the processing of AI functions.

In one aspect, the AI system lane comprises local memory 535. The local memory 535 may be a high speed memory interfaced to the AI application data management hardware 525. It has the data, the layer results, weights, and inputs required by the AI system lane to execute.

In one aspect, the AI system lane comprises a common method processing block 530. The common method processing block 530 contains the hardware to process common functions. For example, encrypting the output, etc.

In one aspect, the AI system lane comprises an AI application data management buffer block 525. The AI application data management buffer block manages the memory requirement between the blocks. It also maintains the data transfer between the global memory and local memory.

In one aspect, the AI system lane comprises data and AI processing chain interconnects 510. All the blocks are connected by the data interconnect bus and an inter-block AI processing chain interconnect bus. The data interconnect bus transfers data within the engines and transfers to local memory. The inter-block AI processing chain interconnect bus carries all the control information. Control blocks include, for example, application buffer management H/W, sequencer, and instruction trigger modules. Data movement is localized within the blocks. The data interconnect bus has higher bandwidth when compared to the inter-block AI processing chain interconnect.

In one aspect, the AI system lane comprises a sequencer 505. The sequencer directs AI chain execution flow as per the inter-block and intra-block transaction definition 545. An AI system lane composer and virtual lane maintainer provides the required definition. The sequencer 505 maintains a queue and a status table. The queue contains model identification (ID), type of methods and configuration data for the layer(s). The model ID differentiates the model being executed. The methods inform the sequencer the type of re-configurable AI compute engine blocks to use. Configuration data contains the macro parameters that are required by the engines to execute the model properly. The status table contains the status of all the AI processing blocks. The table maintenance is active whether the AI processing block is busy or idle. All the operations will be queued by the lane orchestrator in the sequencer 505. The sequencer will trigger the operation from the queue depending on the available AI-PLU block which is idle. Once an operation is completed by the AI-PLU block, the sequencer 505 will change the corresponding entry to idle in the status table and reports it to the lane orchestrator about the completion. The lane orchestrator will now ask the AI system lane for the transfer of the output if all the tasks related to the input with respect to the model are completed.

Figure 6:
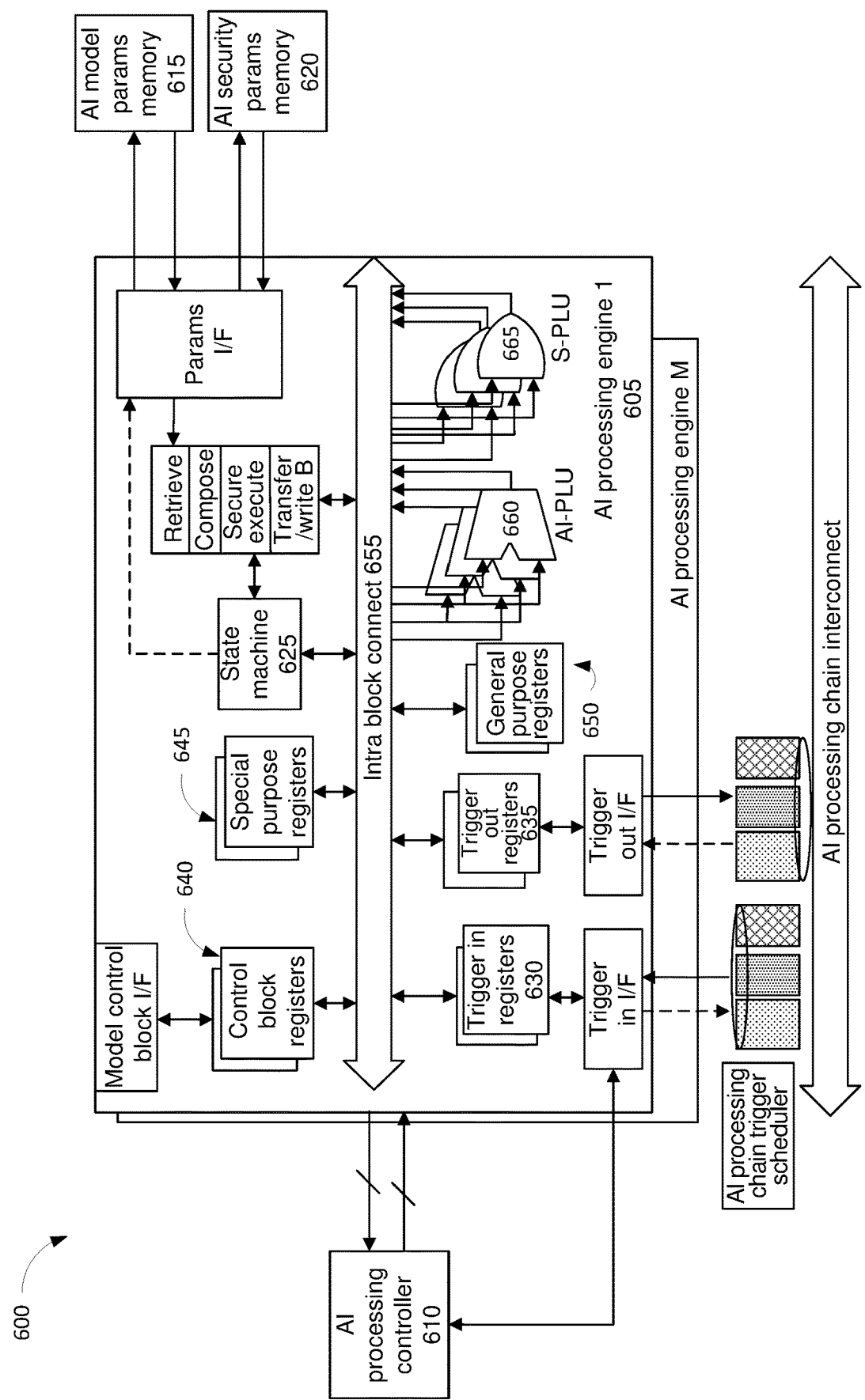
FIG. 6 is a diagram of a secure re-configurable AI compute engine block with no traditional software overhead during model execution (inference or training) for speed and efficiency, in accordance with at least one aspect of the present disclosure.
Figure 7:
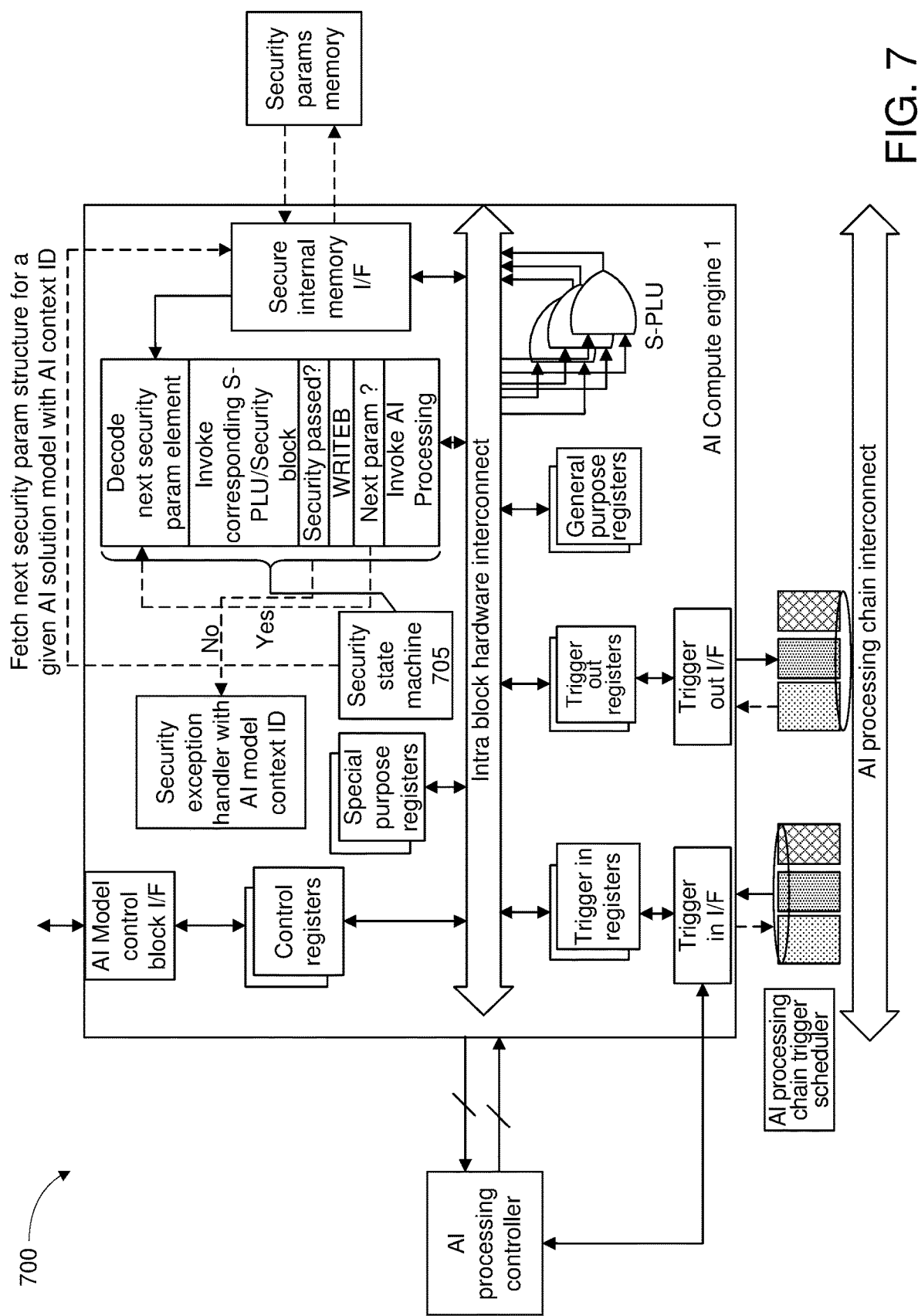
FIG. 7 shows additional detail of how the security state machine may be configured to implement the security features described herein, according to some embodiments.

FIG. 6 is a diagram 600 of a secure re-configurable AI compute engine block 515 (see e.g., FIG. 5) with no traditional software overhead during model execution (inference or training) for speed and efficiency, in accordance with at least one aspect of the present disclosure. As used herein, the secure re-configurable AI compute engine block 515 comprises at least one AI processing engine 605 (shown here are multiple engines 1 through M), an AI processing controller 610 coupled to the processing engine(s) 605, an AI solution model parameters memory 615 coupled to the processing engine(s) 605, and an AI security parameters memory 620 coupled to the processing engine(s) (205. The processing engine comprises a state machine 625, trigger in/out registers 630 and 635, a control register 640, a special purpose register 645, a general purpose register 650, and an intra block connect bus 655 for communication and control between the registers 630, 635, 645, 650, control blocks 640, and state machine 625. The processing engine also comprises AI processing logic units (AI-PLUs) 660 and security processing logic unit (S-PLUs) 665 coupled to the intra block connect bus 655.

In one aspect, the AI compute engine block 515 comprises a plurality of processing engines 605 configured to trigger the state machine 625 for different memory and control transactions. The AI compute engine block 515 manages the chain of triggers required to complete a subsequent layer and also manages the memory transaction triggers. Control transaction includes triggering the state machine 625 corresponding to the method, software resetting the processing engine, etc. The compute engine block 515 also manages the memory triggers triggered by the state machine 625 such as write or read. The memory master, which resides outside of the AI compute engine block 515, will trigger the state machine 625 once the memory transaction triggered by the state machine 625 is completed. So all the combination of AI method trigger, memory transaction trigger, and software reset is managed by the trigger in/out registers 630 and 635.

In one aspect, the AI compute engine block processing engine(s) 605 comprises AI processing logic units (AI-PLUs) 660. Each of the AI-PLUs contains a set of multiplier, comparators and adders functional units. This fabric of functional units can be configured by the AI parameters to process AI methods such as CNN forward/backward, fully connected (FC) forward/backward, max-pooling, un-pooling, etc. This configuration is dependent on the dimensions of the model, type of the AI method and memory width (number of vector inputs that can be fetched at a single clock). The AI-PLU(s) 660 can process wide vectors at a single clock in a pipelined configuration. Hence it has high performance and is energy efficient.

In one aspect, the AI compute engine block processing engine(s) 605 comprises security processing logic units (S-PLUs) 665. Each of the S-PLUs contains a set of cryptographic primitives such as hash functions, encrypt/decrypt blocks, arranged in parallel and pipelined configuration to implement various security/trust functions. This fabric of functional units can be configured with the security parameters to process certain security features. These configurations are directed by the security policy engine. It can process wide security processing vectors at a single clock in a pipelined configuration. Hence, it has high performance and is energy efficient. In addition to protecting the AI application/solution models, S-PLUs in conjunction with AI-PLUs and other security and trust features built on to the AI system can run AI driven security applications for a range of use cases and markets.

In one aspect, the AI compute engine block processing engine(s) 605 comprises a state machine 625. The state machine 625 is the brain of the AI compute engine block. The state machine 625 takes control input and does the required task to complete the computation. The state machine 625 contains four major states: retrieve, compose, execute, and transfer/write back state. The behavior of the state machine 625 can be configured using the parameter set by the configure module namely, security parameters, AI application model parameters, etc. The state machine 625 can run inference or back propagation depending on type of flow chosen. It engages extra PLU's for weight update and delta calculation. In various states, the state machine 625 interfaces with the AI solution model parameters memory and the AI security parameters memory via a parameters interface (I/F).

The retrieve state retrieves the input from the local memory of the AI system lane as described with reference to FIG. 5. Returning now to FIG. 6, the retrieve state also may retrieve the partial output from the previous iteration depending on the data dependency of the computation. If security is enabled, the retrieve state also retrieves security related parameters and credentials.

The compose state composes the input to the AI-PLUs of the AI compute engine 515. This depends on the input length, number of parallel hardware present PLU of the engine and also aligns the inputs in the order in which the parallel hardware in the PLU will process the data.

Once the data is composed, the execute state provides the execute signal to one or more sub-blocks/PLUs (S-PLUs and AI-PLUs) to process the input data.

The transfer/write back state writes back the partial results from the PLUs output to a general purpose register or transfers the final output from the PLUs to the local memory.

In one aspect, the AI compute engine block processing engine 605 comprises a general purpose register 650. The general purpose register 650 stores temporary results. The general purpose register 650 is used to store the partial sum coming from the AI-PLU output. These registers are filled by the write back state of the state machine 625.

In one aspect, the AI compute engine block processing engine comprises a control block register 640. The control block register 640 contains the different model parameters required to control the state machine 625. The control block registers 640 are a set of parameters computed on the fly which is used by the state machine 625 to accommodate the input AI solution model with variable size into the specific width parallel hardware present in the AI-PLU hardware. Control registers are used by the state machine 625 to control execution of each state correctly. The control block registers interface with the AI system lane described with reference to FIG. 5 via a model control interface (I/F).

Returning now to FIG. 6, in one aspect, the AI compute engine block processing engine comprises special purpose registers 645. Special purpose registers 645 are wide bus registers used to perform special operations on a data vector at once. The special purpose register 645 may perform the bit manipulation of the input data vector to speed up the alignment of the vector required by the PLU to process the data. The special purpose register 645 may perform shifting/AND/OR/masking/security operations on the large vector of data at once. These manipulations are controlled by the state machine in the compose state. This vector of data from the special purpose is fed into the parallel PLU hardware to compute.

In one aspect, the AI compute engine block comprises an intra block connect bus 655. The intra block connect bus contains the control and data bus required to the communication with different block present within the AI compute engine block. The data path is a high bandwidth bus which supports wide data width data transfer (e.g., 256 bit/512 bit/1024 bit). The control path requires high bandwidth and less data width buses. Local memory is used by the AI compute engine blocks to compute. An interconnect bus within the lanes fills the local memory, which the AI compute engines use to compute the output. Accordingly, this makes the AI compute engine robust and hence does not require the interconnect bus for improved efficiency.

In one aspect, the AI compute engine block comprises AI solution model parameters stored in the AI solution models parameters memory 615 coupled to the processing engine. The state machine 625 reads and writes AI solution model parameters to and from the AI solution models parameters memory via the parameters interface (I/F). Each of the AI solution model parameters contains the configuration data such as input dimension of the model, weight dimension, stride, type of activation, output dimension and other macro parameters used to control the state machine. Thus, each layer could add up to 32 macro parameters.

In one aspect, the AI compute engine block comprises certain methods for using macro parameters by the control block to set different control parameters to run a layer. These control parameters are used by the state machine hardware to perform different functions such as retrieving, composing, executing, and transferring/writing back. The state machine 625 uses special purpose registers 645 to compose the data using the control parameters. This composed data are given to the AI-PLU to execute and the result is transferred and written back to the general purpose registers 650. Trigger in/out register trigger memory transactions and the type of state machine 625 to complete the job. The triggers are provided via trigger in/out interfaces (I/F). There are multiple parallel instances of processing engines running within the AI compute engine block.

In one aspect, the AI compute engine block comprises AI security parameters stored in the AI security parameters memory 620 coupled to the processing engine 605. The state machine 625 reads and writes AI security parameters to and from the AI security parameters memory 620 via the parameters interface (I/F). The AI security parameters contain the security configuration data corresponding to the AI application model that is currently running. Furthermore, it is dictated by the policy engine.

In various aspects, the present disclosure provides an AI-PLU for high speed wide width and parallel vector processing for extreme speed and efficiency. In one aspect, a generic AI-PLU is a special type of AI sub-block with one or more wide width (>512 bits) multipliers, adders, comparators whose parallel and pipelined arrangement can be re-configured such that one or more sets can run parallel and results from one set to another transferred in a pipelined fashion with maximum performance and power efficiency. A re-configurable AI compute engine block as shown in FIG. 6 may contain one or more AI-PLUS. Based on various arrangements an AI-PLU can take the shape or be implemented as various AI-PLU instances, namely:

a. An AI system processing logic unit (AI-PLU) instance within a convolutional neural network (CNN) AI processing block/engine configured for forward/backward propagation.

b. An AI-PLU instance within a max-pooling AI processing block/engine configured for forward/backward propagation.

c. An AI-PLU instance within an un-pooling AI processing block/engine configured for backward propagation.

d. An AI-PLU instance within a fully connected-recurrent neural network (FC-RNN) AI processing block/engine configured for forward/backward propagation.

It will be appreciated that a RNN is a class of artificial neural network, which has unlike feedforward networks recurrent connections. The major benefit is that with these connections the network is able to refer to last states and can therefore process arbitrary sequences of input. The basic difference between a feed forward neuron and a recurrent neuron that the feed forward neuron has only connections from its input to its output and has two weights, for example. The recurrent neuron instead has also a connection from its output again to its input and therefore it has three weights, for example. The third extra connection is called feed-back connection and with that the activation can flow round in a loop. When many feed forward and recurrent neurons are connected, they form a recurrent neural network. In addition, to CNN, FC, or RNN networks, which are described herein by way of example and not limitation, a user can introduce other blocks. Accordingly, the present disclosure is not limited in this context.

The security features described herein may be performed by a security state machine 705 as part of the AI compute engine. The security state machine may be part of the state machine 625 (see e.g., FIG. 6), or may be a separate set of hardware in the AI compute engine. Illustration 700 of FIG. 7 shows additional detail of how the security state machine 705 may be configured to implement the security features described herein, according to some embodiments. The other structures shown in FIG. 7 are consistent with the structures described in FIG. 6. An embedded part of the AI compute engine block within the AI system lane architecture is the flexible hardware security state machine 705 in conjunction with one or more S-PLUs/security blocks to enforce security principles defined in this disclosure. The security state machine acts as the decision maker that sends instructions to and receives data from the security S-PLUs. If security is enabled, the security state machine 705 may fetch a security parameter structure for a given AI solution model, in some cases using an AI context ID. The security parameter structure may be a slice of data that is ingested and is intended to be processed by the AI solution model, say for performing inferences on the data. Before that, it may be processed by the security state machine 705 to see if the data is secure or malicious. Thus, the AI compute engine may invoke the security state machine 705 to conduct analysis. The security state machine 705 may then decode the security parameter element, invoke the S-PLU security block(s) to conduct a review of the elements, and if it passes, invoke AI processing for that element and fetch the next security parameter structure. If it does not pass, a flag or exception may be raised tied to the AI context ID of that element. Flexibility of the state machine is driven by the security parameter structure for a given AI solution model identified by the AI model execution context ID.

In some embodiments, the security parameter structure is a chain of security parameter elements, where each element contains information, such as:
1. Security execution code that dictates the invocation of specific security feature; and
2. Additional parameters needed for the corresponding security feature.

The security state machine 705 runs through completion until all the elements in the chain are executed, after which it invokes the AI processing part of the compute block.

Figure 8:
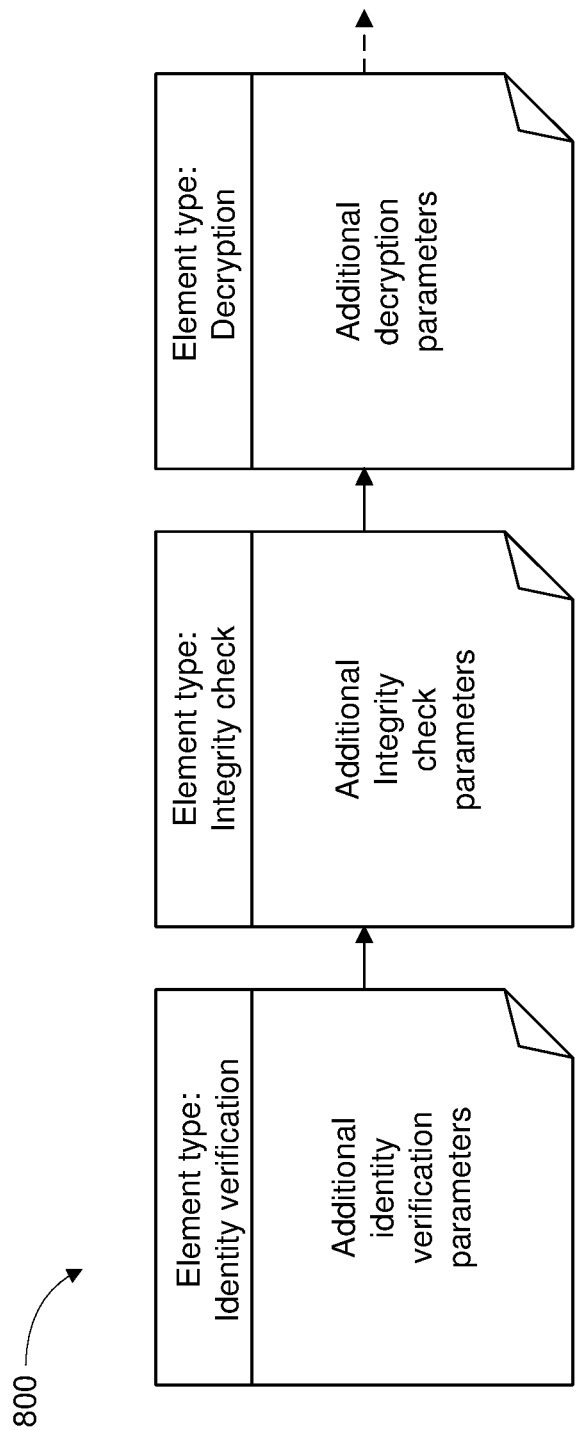
FIG. 8 shows an example process flow of the security protocols, and what are some example inputs used at each step, according to some embodiments.

Illustration 800 of FIG. 8 shows an example security parameter structure, which is accessed with the AI model execution context ID key. The diagram 800 shows an example process flow of the security protocols, and what are some example inputs used at each step.

The security parameter structure with the chain of security elements can be dynamically configured by or on behalf of a user for a given AI model execution context that can be customized to suit the user's needs. This security parameter structure can be stored and accessed using a regular structure block chain structure.

Figure 9:
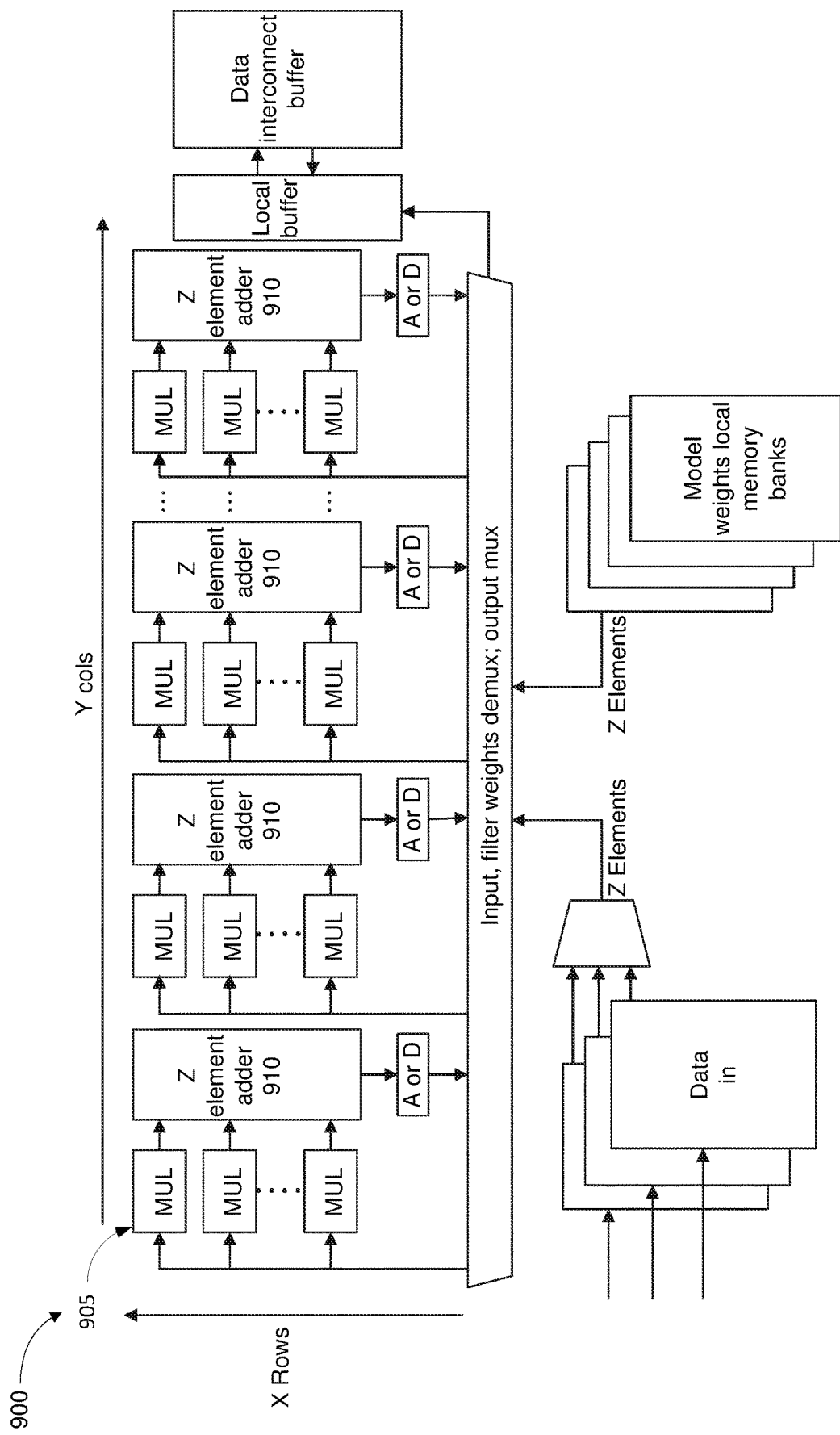
FIG. 9 is a diagram of an AI system processing logic unit (AI-PLU) instance within a convolutional neural network (CNN) AI processing block/engine for forward/backward propagation, in accordance with at least one aspect of the present disclosure.

Referring again to FIG. 7, the steps of the security state machine 705 for a given AI model execution context with a AI model execution context ID can include:
1. Read the security parameter structure for a given AI model execution context with model ID.
2. For each element in the parameter structure chain:
 l. Decode the next security element
 ll. Invoke corresponding S-PLU/security HW block with required parameters provided in the element block
 lll. If security step ii failed, then invoke security exception handler with model context ID; otherwise, go to step iv
 lv. Write back result data to appropriate scratch-pad memory
 v. If the next element is in the chain, then go to step i
3. Invoke AI Processing Logic with the AI Model Context Execution ID Referring to FIG. 9, illustration 900 is a diagram of an AI system processing logic unit (AI-PLU) instance within a convolutional neural network (CNN) AI processing block/engine for forward/backward propagation, in accordance with at least one aspect of the present disclosure. Illustration 900 provides an example of how a PLU might be structured to perform the security checks called on by the security state machine, according to some embodiments. In one aspect, the AI-PLU CNN instance contains an array of multiplier functional units 905 and adder functional units 910. The arrangement of the multiplier and adder functional units in the CNN is dependent on the weight dimension and on forward and backward flow, as described below.

In one aspect, the arrangement of the multiplier and adder functional units in the CNN is dependent upon the AI-PLU CNN forward instance. In forward flow, the functional units are arranged to multiply and add. The X rows represent the weight dimension and the Y columns represent the number of outputs that can be computed in parallel. Therefore, depending on the weight dimension, the number of outputs computed will decrease or increase. Smaller weight dimensions produce a large number of outputs. Similarly, larger weight dimensions produce a small number of outputs. All of these data paths are supported by multiplexing functional units depending on weight dimension. Input and weight is taken as the input. Both are multiplied and added. Then, depending on the activation, the output is moved to the output multiplexer. Here the computations are memory bound and hardware bound. The memory can fetch at least 64 byte/128 byte at a time. Therefore, the speed of the execution would depend on the available hardware. Hence if the inputs required for calculating the Y outputs are within 64 Byte/128 bytes of the vector limit, then those outputs could be processed in the same cycle. For example, if M is the output dimension of the CNN output, then it would take (M/Y)*Weight of the row dimension cycle to compute M outputs. Again, the weight of the row dimension parameter can be removed if the multiple rows of weights can be fetched and make the input dependent on those multiple rows of weights.

In one aspect, the arrangement of the multiplier and adder functional units in the CNN is dependent upon the AI-PLU CNN backward instance. In backward flow, backward propagation requires three computations. First is to calculate weight updates, second is to compute delta sum, and third is bias computation. In backward propagation, the output width is variable. The output provided by the weight update AI-PLU is dependent upon the dimension of the weight. The new weight that is calculated is then forwarded to the delta sum processing engine to calculate the delta matrix. The input for the weight update is the delta from the previous layer, the learning rate, and the output of the previous layer. The delta sum computation requires the updated weight, learning rate, and the delta as the input to calculate the delta sum. Weight update is a summation of the previous weight plus-or-minus the new error. The AI-PLU will calculate the error using the previous layer output and the delta. The old weight is then updated with error. The newly calculated weight is forwarded to delta sum updater that uses the new weight and delta value to calculate the delta sum. The bias update is a sum of old bias minus the error. The error is summation of all delta value times the learning rate. This error is subtracted from the old bias to get the updated bias. The weight update includes multiplication and adder units. The delta sum also includes shift, multiplication, and adder units Each AI system lane comprises a set of AI processing blocks—FC, CNN, LSTM, RNN (LSTM and gated recurring unit [GRU] cells), MaxPool, AvgPool, normalization, SoftMax, sorting, among others, as foundational blocks/engines. The AI system lane is a security centric AI application solution hardware compute engine, as described in connection with FIGS. 5-7, for example. Each of the available blocks/engines can further be configured to activate specific sub blocks within it. An AI processing chain can be created by dynamically composing and accessing foundation blocks in a pipelined and parallel manner to process a given model using the AI system lane composer function as described hereinbelow. Each AI system lane contains local internal memory cells (e.g., SRAM) units to store parameters such as weights, bias and input around each foundational block. All the internal memories are not only connected to the foundational blocks but they also connected to global memory to receive scheduled data bursts. Each foundational block is configurable and expandable. Depending on the composition, one foundation block can trigger another foundation block in the AI processing chain.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as one or more program products in a variety of forms and that an illustrative form of the subject matter described herein applies regardless of the particular type of signal-bearing medium used to actually carry out the distribution.

Instructions used to program logic to perform various disclosed aspects can be stored within a memory in the system, such as DRAM, cache, flash memory, or other storage. Furthermore, the instructions can be distributed via a network or by way of other computer-readable media. Thus a machine-readable medium may include any mechanism for storing or transmitting information in a form readable by a machine (e.g., a computer), but is not limited to, floppy diskettes, optical disks, CD-ROMs, magneto-optical disks, ROM, RAM, EPROM, EEPROM, magnetic or optical cards, flash memory, or tangible, machine-readable storage used in the transmission of information over the Internet via electrical, optical, acoustical, or other forms of propagated signals (e.g., carrier waves, infrared signals, digital signals). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, DSP, PLD, programmable logic array (PLA), or FPGA), state machine circuitry, firmware that stores instructions executed by programmable circuitry, and any combination thereof. The control circuit may, collectively or individually, be embodied as circuitry that forms part of a larger system, for example, an integrated circuit, an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an application, software, firmware, and/or circuitry configured to perform any of the aforementioned operations. Software may be embodied as a software package, code, instructions, instruction sets, and/or data recorded on non-transitory computer-readable storage medium. Firmware may be embodied as code, instructions, instruction sets, and/or data that are hard-coded (e.g., non-volatile) in memory devices.

As used in any aspect herein, the terms "component," "system," "module," and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet-switched network. The communication devices may be capable of communicating with each other using a selected packet-switched network communications protocol. One example communications protocol may include an Ethernet communications protocol which may be capable permitting communication using a Transmission Control Protocol/IP. The Ethernet protocol may comply or be compatible with the Ethernet standard published by the Institute of Electrical and Electronics Engineers (IEEE) titled "IEEE 802.3 Standard," published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum, titled "ATM-MPLS Network Interworking 2.0," published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, and/or standby-state components, unless context requires otherwise.

Those skilled in the art will recognize that, in general, terms used herein, and especially in the appended claims (e.g., bodies of the appended claims), are generally intended as "open" terms (e.g., the term "including" should be interpreted as "including, but not limited to"; the term "having" should be interpreted as "having at least"; the term "includes" should be interpreted as "includes, but is not limited to"). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations or two or more recitations). Furthermore, in those instances where a convention analogous to "at least one of A, B, and C, etc." is used, in general, such a construction is intended in the sense that one having skill in the art would understand the convention (e.g., "a system having at least one of A, B, and C" would include, but not be limited to, systems that have A alone, B alone, C alone, A and B together, A and C together, B and C together, and/or A, B, and C together). In those instances where a convention analogous to "at least one of A, B, or C, etc." is used, in general, such a construction is intended in the sense that one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those within the art that typically a disjunctive word and/or phrase presenting two or more alternative terms, whether in the description, claims, or drawings, should be understood to contemplate the possibilities of including one of the terms, either of the terms, or both terms, unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials are not inconsistent herewith. As such, and to the extent necessary, the disclosure as explicitly set forth herein supersedes any conflicting material incorporated herein by reference. Any material, or portion thereof, that is said to be incorporated by reference herein but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

EXAMPLES

Various aspects of the subject matter described herein are set out in the following numbered examples:

Example 1. An artificial intelligence (AI) architecture configured to provide a trusted and secured environment for running AI applications/solutions models, the AI architecture comprising: a trust and integrity module configured to verify AI application/solution model data and parameters and related state machine parameters before and during running (training or performing inference) an AI solution model; an identity and trust module to establish identity and trust between an entity and the AI application/solution model configured to ensure that the rightful stake holder is running the AI application/solution model; a built-in module incorporated into the AI architecture configured to provide trust and security to run the AI applications/solution models; and at least one real-time attack detection and prevention module built into an AI architecture lane.

Example 2. The AI architecture of Example 1, wherein the trust and integrity module is embedded in a state machine engine of the AI architecture hardware.

Example 3. The AI architecture of Example 2, wherein the state machine engine engages a security processing logic unit (S-PLU) hashing instance and then hashes the model by chunks or hashes of the entire AI solution model.

Example 4. The AI architecture of Example 3, wherein the state machine engine verifies the generated hashes with hashes provided by a user and determines that the integrity of the model is not compromised based on a match between both hashes.

Example 5. The AI architecture of Example claim 3, wherein the state machine comprises a security component within a compute block of the AI architecture in conjunction with the S-PLU configured to enforce security.

Example 6. The AI architecture of Example 5, wherein the security component of the state machine belonging to the compute block/engine is configured to: retrieve security parameters taken such as a decryption key or digest value; compose the S-PLU to process hashing; execute by invoking an S-PLU hash instance with digest value and necessary model data and ascertain the integrity of the AI solution model if the result matches; and invoke a decryption with the decryption key, if the AI solution model encryption is enabled.

Example 7. The AI architecture of any one of Examples 1 to 6, further comprising: an isolation module configured to provide secure isolation between lanes of a virtual AI architecture multilane and to prevent leakage and theft.

Example 8. The AI architecture of any one of Examples 1 to 7, further comprising: a built in detection mechanism configured to detect related rogue security attack elements inserted during a manufacturing process of AI architecture hardware.

Example 9. The AI architecture of any one of Examples 1 to 8, further comprising: an interconnection mechanism configured to communicatively connect to one or more other AI solution models in a coordinated and secure fashion.

Example 10. The AI architecture of Example 9, wherein the interconnection mechanism comprises block chain technology.

Example 11. A trusted artificial intelligence (AI) architecture model network, wherein the network is configured to: ascertain identity of a member belonging to a trusted AI network model membership through credentials; verify that the model belongs to the trusted AI solution model network; allow storage and retrieval of AI solution models to/from the AI solution model network in a distributed fashion; provide provision to monitor and detect bad member for accountability having trusted arbitration authority; and acquire credentials from a trusted network and enforce AI applications/solutions with a hardware security enabled state machine in conjunction with a security processing logic unit (S-PLU) in cloud and edge environments while running a model for a given user member.

What is claimed is:

1. An artificial intelligence (AI) architecture configured to provide a trusted and secured environment for running AI applications/solutions models, the AI architecture comprising:
    a trust and integrity module configured to verify AI application/solution model data and parameters and related state machine parameters before and during running (training or performing inference) an AI solution model;
    an identity and trust module to establish identity and trust between an entity and the AI application/solution model configured to ensure that the rightful stake holder is running the AI application/solution model;
    a built-in module incorporated into the AI architecture configured to provide trust and security to run the AI applications/solution models; and
    at least one real-time attack detection and prevention module built into an AI architecture lane, wherein the AI architecture is a multi-lane hardware architecture, and wherein the AI architecture further comprises a hardware isolation module configured to provide secure isolation between lanes of the AI architecture and to prevent leakage and theft, and
        wherein the trust and integrity module is embedded in a state machine engine of the AI architecture hardware and the state machine engine verifies the generated hashes with hashes provided by a user and determines that the integrity of the model is not compromised based on a match between both hashes.

2. The AI architecture of claim 1, wherein the trust and integrity module is embedded in a state machine engine of the AI architecture hardware.

3. The AI architecture of claim 1, wherein the state machine comprises a security component within a compute block of the AI architecture in conjunction with the S-PLU configured to enforce security.

4. The AI architecture of claim 3, wherein the security component of the state machine belonging to the compute block/engine is configured to:
    retrieve security parameters taken such as a decryption key or digest value; compose the S-PLU to process hashing;
    execute by invoking an S-PLU hash instance with digest value and necessary model data and ascertain the integrity of the AI solution model if the result matches; and
    invoke a decryption with the decryption key, if the AI solution model encryption is enabled.

5. The AI architecture of claim 1, further comprising: a built in detection mechanism configured to detect related rogue security attack elements inserted during a manufacturing process of AI architecture hardware.

6. The AI architecture of claim 1, further comprising: an interconnection mechanism configured to communicatively connect to one or more other AI solution models in a coordinated and secure fashion.

7. The AI architecture of claim 6, wherein the interconnection mechanism comprises block chain technology.

8. A trusted artificial intelligence (AI) architecture, comprising a trusted AI solution model network, wherein the trusted AI solution model network, is configured to:
    ascertain identity of a member belonging to the trusted AI network solution model network membership through credentials;
    verify that the AI solution model belongs to the trusted AI solution model network;
    allow storage and retrieval of AI solution models to/from the trusted AI solution model network in a distributed fashion;
    provide provision to monitor and detect bad member for accountability having trusted arbitration authority; and
    allow acquisition of credentials from the trusted AI solution model network to enforce AI applications/solutions with a hardware security enabled state machine in conjunction with a hardware security processing logic unit in cloud and/or edge environments while running the AI solution a model for a given user member;
        wherein the trust and integrity module is embedded the state machine engine of the AI architecture hardware and the state machine engine verifies the generated hashes with hashes provided by a user and determines that the integrity of the model is not compromised based on a match between both hashes.

9. The trusted AI architecture of claim 8, comprising:
    a trust and integrity module configured to verify that the AI solution model belongs to the trusted AI solution model network;
    an identity and trust module to establish identity and trust between an entity and the AI application/solution model configured to ensure that the rightful stake holder is running the AI application/solution model;
    a built-in module incorporated into the AI architecture configured to provide trust and security to run the AI applications/solution models; and
    at least one real-time attack detection and prevention module built into an AI architecture lane.

10. The trusted AI architecture of claim 9, wherein the trust and integrity module, the identity and trust module, built-in module incorporated into the AI architecture, and the at least one real-time attack detection and prevention module are each embedded in hardware and configured to operate without a software operating system.

11. The trusted AI architecture of claim 8, wherein the trust and integrity module is embedded in a hardware based state machine engine.

12. The trusted AI architecture of claim 11, wherein the state machine engine engages a security processing logic unit (S-PLU) hashing instance and then hashes the model by chunks or hashes of the entire AI solution model.

13. The trusted AI architecture of claim 12, wherein the state machine engine verifies the generated hashes with hashes provided by a user and determines that the integrity of the AI solution model is not compromised based on a match between both hashes.

14. The trusted AI architecture of claim 12, wherein the state machine comprises a security component within a compute block of the AI architecture in conjunction with the S-PLU configured to enforce security.

15. The trusted AI architecture of claim 14, wherein the security component of the state machine belonging to the compute block/engine is configured to:
- retrieve security parameters taken such as a decryption key or digest value;
- compose the S-PLU to process hashing;
- execute by invoking an S-PLU hash instance with digest value and necessary model data and ascertain the integrity of the AI solution model if the result matches; and
- invoke a decryption with the decryption key, if the AI solution model encryption is enabled.

* * * * *